Patented Oct. 13, 1942

2,298,303

UNITED STATES PATENT OFFICE 2,298,303

AZO DYESTUFFS

Emil Eduard Misslin and Rudolf Thomann, Basel, Switzerland, assignors to Society of Chemical Industry in Basle, Basel, Switzerland No Drawing. Application March 15, 1940, Serial No. 324,227. In Switzerland February 10, 1937

13 Claims. (Cl. 260—173)

Application is a continuation-in-part of our application Serial No. 189,689, filed February 9, 1938.

Processes are known for introducing aryl residues having external amino-groups into dyestuffs and their intermediate products in order to change such compounds into products that may be diazotized on the fibre and developed with suitable coupling components to fast dyestuffs (compare Colour Index Nos. 324 and 324a).

This invention is based on the observation that in respect especially of the properties and in particular strength of the dyestuffs produced by diazotation and development on the fibre by suitable coupling components and also their intermediate products the results produced are improved by introducing by known methods into an intermediate product or azo-dyestuff containing an amino-group an externally bound aryl residue which contains two amino-groups, one of which contains as a substituent an acyl residue having at least one amino-group capable of being diazotized.

The new products are thus characterized by the presence of the atomic grouping

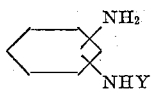

in which Y is an acyl-group which also carries an amino-group capable of being diazotized.

It is also possible to introduce the atomic grouping defined above by first reducing a dinitrated aromatic acid, for instance dinitrobenzene-carboxylic or sulfonic acid to the corresponding nitro-amino or diamino acid, condensing the latter with one mol of an acylating agent which contains a group convertible to an amino-group capable of being diazotized, then converting the condensation product into its corresponding acid chloride, condensing this latter with a suitable parent material containing an amino-group and finally converting into the amino-group, the group so convertible. These products, which are characterized by the presence of the above atomic grouping, may then be developed as such to dyestuffs on the fibre or, in case they have positions suitable for coupling, as is the case, for example, if the parent material is an amino-hydroxynaphthalene derivative, converted into dyestuffs by means of suitable diazo-compounds, which dyestuffs still have the characteristic atomic grouping, so that they may be further developed on the fibre.

Among parent materials which come into question for introducing into the intermediate product the external group having two nitro-groups there may be named dinitrobenzoylchloride, dinitrobenzenesulfochloride, dinitrophenoxyacetic acid chloride, dinitrobenzaldehyde or the like. Among acylating agents which come into question for introducing the acyl-groups indicated by Y which contain a group capable of being diazotized may be named meta-nitrobenzoylchloride, para-nitrobenzoylchloride, para-nitrophenoxyacetic acid chloride, meta-nitrobenzenesulfochloride or the like. If in such products the nitro-group is exchanged for an easily eliminated acidylamino-group the latter can be saponified after the condensation is complete.

As suitable intermediate products containing at least one amino-group which condense with dinitrobenzoylchloride or its above-named equivalents and may then be further worked-up may be named the simple amines of the benzene series and their substitution products, for example aniline, its ortho-, para- or meta-sulfonic acids, naphthylamines and their sulfonic acids, amino-hydroxynaphthalene-sulfonic acids, particularly 1-amino-8-hydroxynaphthalene-3:6- or -4:6-disulfonic acid and 2-amino-5-hydroxynaphthalene-7-sulfonic acid, particularly 1:7-disulfonic acid, also diamines such as ortho-, meta- or para-phenylenediamine, 1:8-naphthylenediamine or its sulfonic acid, 1:2-diamino-5-hydroxynaphthalene-7-sulfonic acid; also products which belong to other series, for instance 4:4'-diaminostilbene-2:2'-disulfonic acid dehydrothiotoluidine-mono- and -di-sulfonic acid, dehydrothioxylidinedisulfonic acid, sulfonic acids of the primuline base.

The new products, whether they are dyestuffs or intermediate products, are characterized in the most part by a pronounced affinity for vegetable fibres so that they are adsorbed by these from neutral or feebly alkaline baths and may then be converted on the fibre by diazotization and development with coupling components into dyestuffs. In the case of intermediate products this is especially so if in the processes indicated in the introduction there are selected as parent materials thiazole-sulfonic acids, such as dehydrothiotoluidine-disulfonic acids or diaminostilbenedisulfonic acid.

The dyestuffs obtainable by the invention are characterized by an abundance of externally diazotizable amino-groups without, however, having too high molecular weight. They are thus characterized by the high coloring strength of the dyeings diazotized on the fibre.

The following examples illustrate the invention, the parts being by weight:

Example 1

403 parts of 2-(3'-amino-5'-nitro)benzoylamino-5-hydroxynaphthalene-7-sulfonic acid are dissolved in dilute sodium carbonate solution so as to produce a neutral solution and condensed in the presence of chalk with 185 parts of para-nitrobenzoylchloride at 70–95° C. with vigorous stirring. After reduction with iron and dilute acetic acid the iron salts are precipitated by means of sodium carbonate, filtered and the filtrate acidified to precipitate the 2-[3'-(4''-amino) benzoylamino-5'-amino]benzoylamino-5-hydroxynaphthalene-7-sulfonic acid in the form of a colorless sparingly soluble precipitate which when dry is a light grey powder freely soluble in alkalis. The new compound has the following constitution:

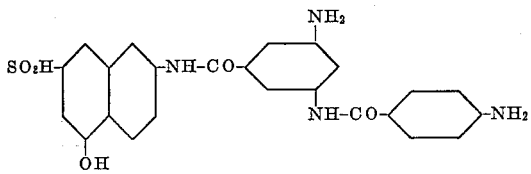

The same compound is also obtained if instead of 2-(3'-amino-5'-nitro)benzoylamino - 5 - hydroxynaphthalene-7-sulfonic acid there is used the 2-(3'-amino-5'-acetamino)benzoylamino-5-hydroxynaphthalene-7-sulfonic acid which is subjected to condensation with para-nitrobenzoylchloride and then the acetamino-group is converted before or after the reduction of the nitro-group by means of iron into the amino-group by saponification.

When instead of para-nitrobenzoylchloride, meta-nitrobenzoylchloride is used, a compound of the formula

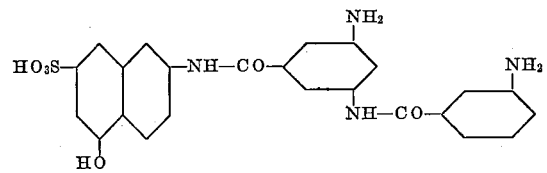

is obtained, whereas the exchange of the para-nitrobenzoylchloride for the para-nitrophenoxy acetic acid chloride leads to a compound of the formula

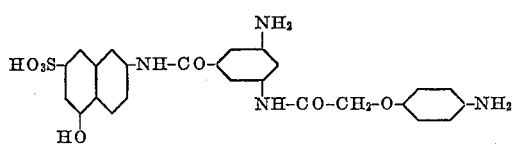

From 2-amino-8-hydroxynaphthalene-6-sulfonic acid, 1-amino-8-hydroxynaphthalene-4-sulfonic acid, 1-amino-8-hydroxynaphthalene-3:6-disulfonic acid, 1-(3'-amino)-phenyl - 5 - pyrazolone-3-carboxylic acid there are obtained in similar manner the products of the formulas:

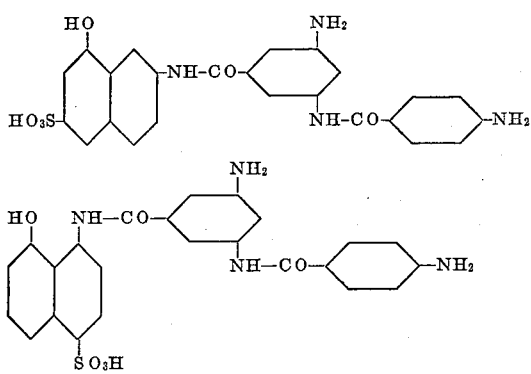

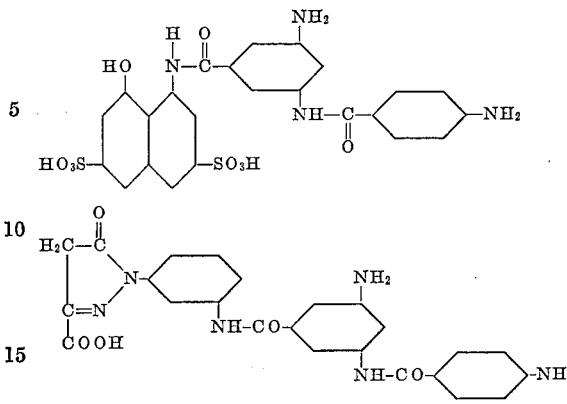

Example 2

The carboxylic acid chloride compound obtained by the action of phosphorus pentachloride on the 3-(4'-nitro) benzoyl-amino-5-nitrobenzoic acid (produced by condensation of 1 mol paranitrobenzoyl chloride with 1 mol 3:5-nitroaminobenzoic acid according to known methods) is condensed in molecular proportion in the presence of chalk for maintaining the reaction neutral with 2-amino-5-hydroxynaphthalene-7-sulfonic acid in an aqueous solution at about 100° C. and while well stirring and then reduced with iron and dilute acetic acid. After working up in the usual manner there is obtained the new acid described in Example 1, first paragraph.

Example 3

One gram mol. of the carboxylic acid chloride compound described in Example 2 is allowed to act in the presence of chalk and while well stirring on a neutral aqueous solution of one gram mol. 1 - (3'-amino-5'-nitro) benzoylamino-8-hydroxynaphthalene-3:6-disulfonic acid until the aroylation of the amido group is complete. After reducing with iron and dilute acetic acid and working up according to known methods, the new compound of the formula

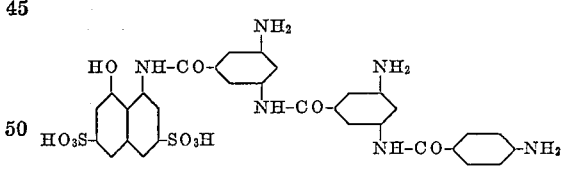

is obtained as a nearly colorless powder which is easily soluble in dilute alkalies solution with diazo compounds.

Example 4

A neutral solution of 370 parts of 4:4'-diaminostilbene-2:2'-disulfonic acid is mixed with an excess of chalk and then treated, while vigorously stirring, at 80–100° C. with 3-acetamino-5-nitrobenzoylchloride until no free amino-group is found to remain. The mixture is then reduced with iron and dilute formic acid and from the solution freed from the iron salt the 4:4'-di-(3 - acetamino - 5 - amino) benzoylaminostilbene-2:2'-disulfonic acid is isolated by acidification.

This compound is dissolved to a neutral solution in water, and in presence of enough chalk to maintain neutrality during the reaction is treated with about 370 parts of paranitrobenzoylchloride at 80–100° C. until no more free amino-group can be detected. Reduction in the usual manner follows and the acetamino-group is converted into the amino-group by saponification with caustic alkali in known manner.

The new compound, which probably has the formula

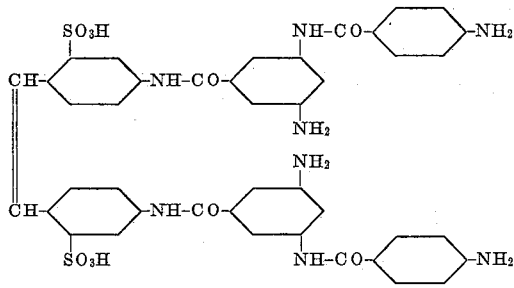

is, when dry, a yellowish white powder soluble in alkalis to a feebly yellow solution.

When cotton is treated, in the manner adopted for dyeing with substantive dyestuffs, with a solution alkaline with sodium carbonate of the new compound it remains nearly colorless and on treatment with acid and nitrite acquires the yellow-orange color of the sparingly soluble octazo-compound; by then coupling with alkaline β-naphthol solution there is produced a brilliant intense red-orange fast to washing or with β-hydroxynaphthoic acid a deep red or with 1-phenyl-3-methyl-5-pyrazolone an intense yellow.

*Example 5*

12.1 parts of meta-xylidine are diazotized in known manner and at 5–10° C. the solution is allowed to flow into a solution alkaline with sodium carbonate of 52 parts of the intermediate product of the first paragraph of Example 1. The operation is complete within 30 minutes while stirring well. After standing for 1 hour at the said temperature the mass is further stirred and filtered with suction. The solid matter is subsequently washed with a little cold water. This dyestuff of the formula

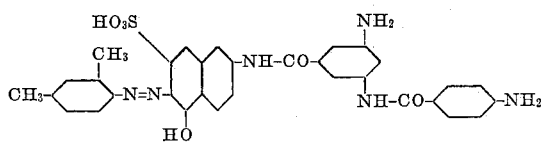

is a red brown powder when dry. It dyes cotton pure bluish red. By diazotization on the fibre and development with β-naphthol there is obtained a brilliant red of very good fastness to washing.

Instead of meta-xylidine there may be used aniline, ortho-toluidine, ortho-anisidine, para-chloraniline, β-naphthylamine or the like. Valuable similar dyestuffs are also obtained when other azo-components than those named above are used, for example the product obtained from 2-(3'-amino-5'-nitro)benzoylamino-5-hydroxynaphthalene-7-sulfonic acid by condensation with 1 mol meta-nitrobenzoylchloride and subsequent reduction.

A yellow dyestuff, which when further diazotized on the fibre and developed with 1-phenyl-3-methyl-5-pyrazolone is intensely yellow, is obtained by diazotizing 173 parts of sulfanilic acid, and coupling with 472 parts of the compound last named in the fourth paragraph of Example 1 in dilute acetic acid solution and then salting out from a solution alkaline with sodium carbonate. It has the formula

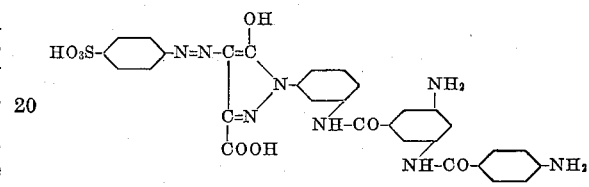

*Example 6*

277 parts of para-aminoazobenzenesulfonic acid are diazotized at 5–10° C. and the solution is added to an ammoniacal solution of 492 parts of the intermediate product of the first paragraph of Example 1. After some time so much common salt is added to the solution of the dyestuff that there is produced a common salt solution of 15 per cent strength. This is heated to 50° C. and filtered. The residue is again stirred into a solution of common salt alkaline with sodium carbonate and of 17° Bé., the whole is boiled and filtered with suction. The dyestuff of the formula

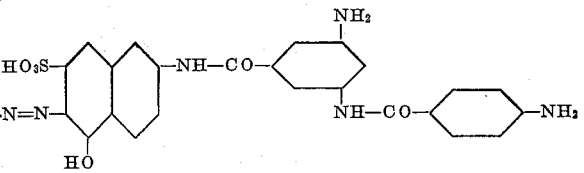

thus obtained is, when dry, a pure dark bronze colored powder. It dyes cotton bluish red. By diazotizing the dyeing and developing with β-naphthol there is produced an intense brilliant red which is very fast to washing.

By diazotizing the para-toluene-sulfoester of 1-amino-8-hydroxynaphthalene-3:6-disulfonic acid, coupling with 1-amino-2:5-hydroquinone-diethyl ether and diazotizing the intermediate dyestuff in known manner there is obtained a diazo-component which when added in equivalent proportion to a solution alkaline with sodium carbonate of the intermediate product of the penultimate formula of Example 1 at 0–5° C. couples to form a blue dyestuff. When this dyestuff is freed by the usual method in alkaline solution from the para-toluene-sulfo-residue and isolated there is obtained a dark violet dyestuff powder of the formula

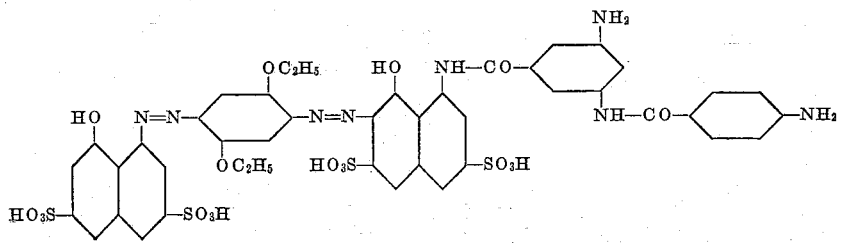

This diazo-dyestuff dyes cotton blue; by diazotizing and developing with 1-phenyl-3-methyl-5-pyrazolone an intense green is produced.

If the diazo-component obtained from 2-diazonaphthalene-5-sulfonic acid by diazotizing and coupling with 1-amino-2-methoxynaphthalene-6-sulfonic acid and further diazotizing is added to an equivalent proportion of an ammoniacal solution containing pyridine of the intermediate product of the first paragraph of Example 1 at 0–5° C.; there is produced a blue dyestuff which after expulsion of the pyridine is directly filtered and dried. The dyestuff dyes cotton directly blue; when diazotized on the fibre and developed with 1-phenyl-3-methyl-5-pyrazolone it yields an intense green.

A further green dyestuff may be obtained by coupling the intermediate product of the first paragraph of Example 1 in the presence of pyridine with the diazotized monoazo-dyestuff from 1-diazo-2:5-dichlorobenzene-4-sulfonic acid and 1-amino-2-methoxynaphthalene-6 - sulfonic acid. This new dyestuff of the formula methyl-5-pyrazolone it yields an intense green which is thoroughly fast to washing and capable of discharge.

A further green trisazo-dyestuff is formed by coupling the intermediate product of the penultimate formula of Example 1 in a solution alkaline with sodium carbonate with the diazotized disazodyestuff obtainable by coupling the para-toluenesulfonic acid ester of 1-diazo-8-hydroxynaphthalene-3:6-disulfonic acid ester of 1-diazo-8-hydroxynaphthalene - 3:6 - disulfonic acid with 1 - amino - 2:5 - hydroquinone - diethyl ether and further diazotizing this monoazo-dyestuff and coupling with a mixture of 1-aminonaphthalene 6- and -7-sulfonic acids. By eliminating the para-toluenesulfo-residue in alkaline solution and isolating the dyestuff there is obtained a dyestuff of the formula

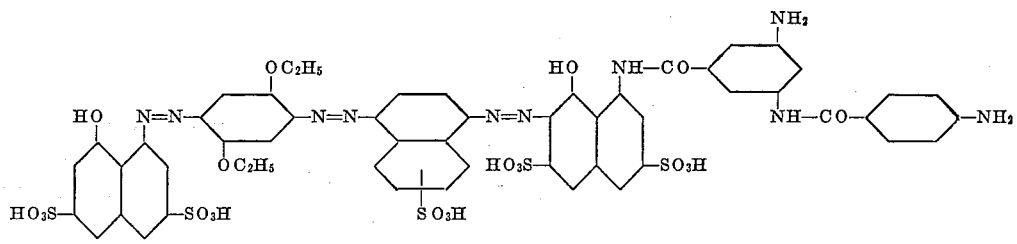

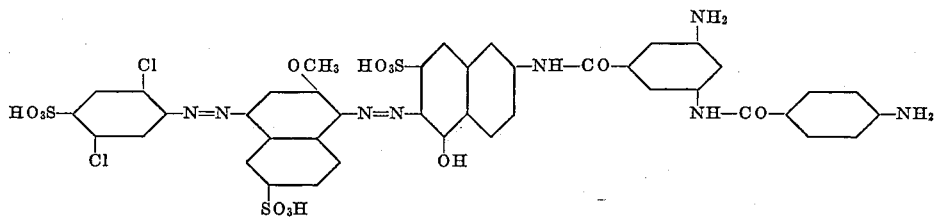

dyes cotton blue green; by diazotizing on the fibre and developing with 1-phenyl-3-methyl-5-pyrazolone the blue-green dyeing becomes a brilliant intense green fast to washing.

Similar dyestuffs are obtained if in this example the end component is exchanged for another amino-naphthol derivative referred to in Example 1 or 2.

*Example 7*

A green trisazo-dyestuff may be obtained by coupling the intermediate product of the first paragraph of Example 1 in presence of pyridine with the diazotized disazo-dyestuff from diazotized para-aminoazobenzenesulfonic acid and 1-amino - 2 - methoxynaphthalene-6-sulfonic acid. The new dyestuff of the formula which dyes cotton directly blue; when diazotized on the fibre with 1-phenyl-3-methyl-5-pyrazolone it yields an intense green.

Similar dyestuffs are obtained if in this example there is substituted for the final components another aminonaphthol derivative named in Example 1 or 2.

*Example 8*

A dyebath is prepared with 40 per cent of Glaubers salt, 0.5 per cent of benzoylated and then sulfonated μ-heptadecylbenzimidazole and 1 per cent of the dyestuff of paragraph 4 of Example 6. Cotton is entered at 40–50° C., the bath is heated gradually to 90–95° C. and kept for one hour at this temperature. The dyed and rinsed goods are immersed for 15–20 minutes in a fresh cold bath containing 0.1 per cent of sodium nitrite and 3 per cent of sulfuric acid, then rinsed for a short time in cold water and immediately introduced into a developing bath containing 0.4 per cent of 1-phenyl-3-methyl-5-pyrazolone and 0.2 per cent of sodium carbonate.

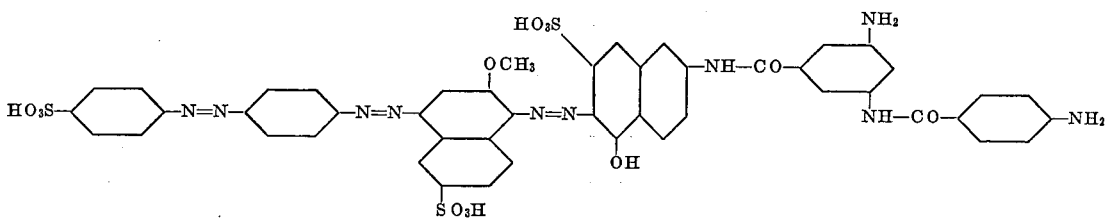

dyes cotton directly blue-green; when diazotized on the fibre and developed with 1-phenyl-3-

There is produced an intense pure green dyeing.

What we claim is:

1. The azo-dyestuffs of the general formula

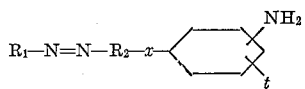

in which R stands for an aromatic radical selected from the group consisting of radicals of the benzene and naphthalene series, $R_2$ stands for the radical of a coupling component containing at least one amino group, $x$ stands for a linking group which has been formed by the action of a member of the group consisting of COOH and $SO_3H$ linked to the benzene nucleus, on an amino group of the coupling component corresponding to the symbol $R_2$, in which $t$ stands for a $NH_2$ group acidylated by an acyl radical containing a diazotizable amino group, which products are more or less dark powders which dissolve in water to yellow, to orange, to red, to violet, to blue and to green solutions which dye the fiber similar tints and which are diazotizable on the fiber and capable of being developed with β-naphthol and 1-phenyl-3-methyl-5-pyrazolone.

2. The azo-dyestuffs of the general formula

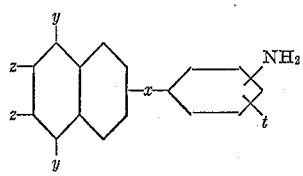

in which the naphthalene nucleus carries at least one sulfonic acid group, one $y$ stands for a OH-group and the other $y$ stands for a hydrogen atom, one $z$ stands for a member of the group consisting of a $SO_3H$ group and a hydrogen atom and the other $z$ stands for a —N=N—R group wherein R means an aromatic radical selected from the group consisting of radicals of the benzene and naphthalene series and wherein the —N=NR group stands in ortho-position to the OH-group, in which $x$ stands for a linking group which has been formed by the action of a member of the group consisting of COOH and $SO_3H$ linked to the benzene nucleus, on amino groups linked to the naphthalene nucleus, in which $t$ stands for an amino group acidylated by an acyl radical containing a diazotizable amino group, which products are more or less dark powders dissolving in water to red, to violet, to blue and to green solutions and dyeing the fiber similar tints.

3. The azo-dyestuffs of the general formula

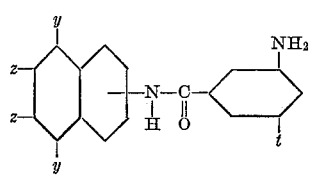

in which the naphthalene nucleus carries at least one sulfonic acid group, one $y$ stands for a OH-group and the other $y$ stands for a hydrogen atom, one $z$ stands for a member of the group consisting of a $SO_3H$ group and a hydrogen atom, and the other $z$ stands for a —N=N—R— group wherein R means an aromatic radical selected from the group consisting of radicals of the benzene and naphthalene series and wherein the —N=N—R—group stands in ortho-position to the OH-group, and in which $t$ stands for a

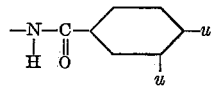

group, one $u$ standing for H and the other $u$ standing for an amino group, which products are more or less dark powders dissolving in water to red, to violet, to blue and to green solutions and dyeing the fiber similar tints.

4. The azo-dyestuffs of the general formula

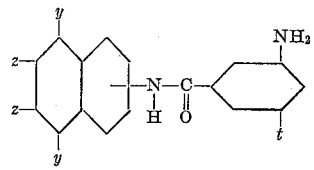

in which one $y$ stands for a OH-group and the other $y$ stands for a hydrogen atom, one $z$ stands for a $SO_3H$-group and the other $z$ stands for a —N=N—R-group wherein R means an aromatic radical selected from the group consisting of radicals of the benzene and naphthalene series and wherein the —N=N—R-group stands in ortho-position to the OH-group, and in which $t$ stands for a

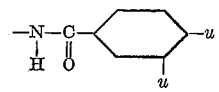

group, one $u$ standing for H and the other $u$ standing for an amino group, which products are more or less dark powders dissolving in water to red, to violet, to blue and to green solutions and dyeing the fiber similar tints.

5. The azo-dyestuffs of the general formula

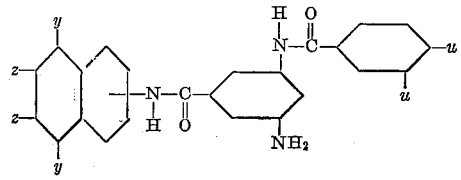

in which one $y$ stands for a OH-group and the other $y$ stands for a hydrogen atom, one $z$ stands for a $SO_3H$-group and the other $z$ stands for a —N=N—R-group wherein R means an aromatic radical selected from the group consisting of radicals of the benzene and naphthalene series, and wherein the —N=N—R-group stands in ortho-position to the OH-group, in which one $u$ stands for a hydrogen atom and the other $u$ stands for a $NH_2$ group, which products are more or less dark powders dissolving in water to red, to violet, to blue and to green solutions and dyeing the fiber similar tints.

6. The azo-dyestuffs of the general formula

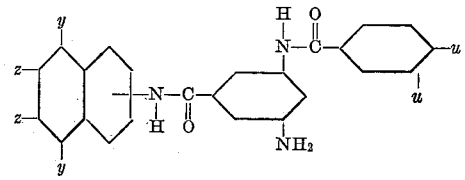

in which one $y$ stands for a OH-group and the other $y$ stands for a hydrogen atom, one $z$ stands for a $SO_3H$-group and the other $z$ stands for a —N=N—R-group wherein R means the radical of an amino-azo-dyestuff and wherein the —N=N—R-group stands in ortho-position to the OH-group, in which one $u$ stands for a hydrogen atom and the other $u$ stands for a NH₂ group, which products are more or less dark powders dissolving in water to red, to violet, to blue and to green solutions and dyeing the fiber similar tints.

7. The azo-dyestuffs corresponding in the free state to the general formula

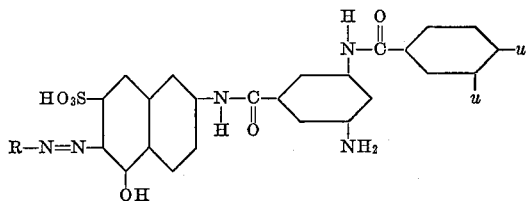

in which R means an aromatic radical selected from the group consisting of radicals of the benzene and naphthalene series, one $u$ stands for a hydrogen atom and the other $u$ stands for a NH₂ group, which products are more or less dark powders dissolving in water to red, to violet, to blue and to green solutions and dyeing the fiber similar tints.

8. The azo-dyestuffs corresponding in the free state to the general formula

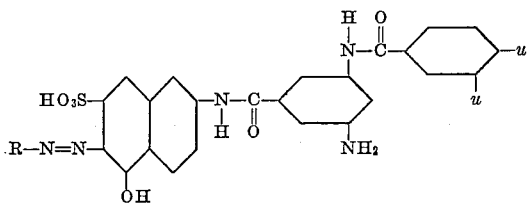

in which R means the radical of an azo-dyestuff, one $u$ stands for a hydrogen atom and the other $u$ stands for a NH₂ group, which products are more or less dark powders dissolving in water to red, to violet, to blue and to green solutions and dyeing the fiber similar tints.

9. The azo-dyestuffs corresponding in the free state to the general formula

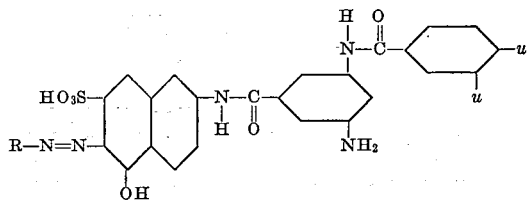

in which R means the radical of an azo-dyestuff containing at least one naphthalene nucleus, one $u$ stands for a hydrogen atom and the other $u$ stands for a NH₂ group, which products are more or less dark powders dissolving in water, to violet, to blue and to green solutions and dyeing the fiber similar tints.

10. The azo-dyestuffs corresponding in the free state to the general formula

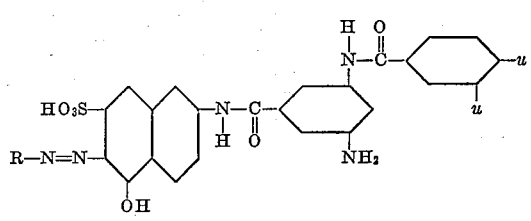

in which R means the radical of a mono-azo-dyestuff containing at least one naphthalene nucleus, one $u$ stands for a hydrogen atom and the other $u$ stands for a NH₂-group, which products are more or less dark powders dissolving in water to violet, to blue and to green solutions and dyeing the fiber similar tints.

11. The azo-dyestuffs corresponding in the free state to the general formula

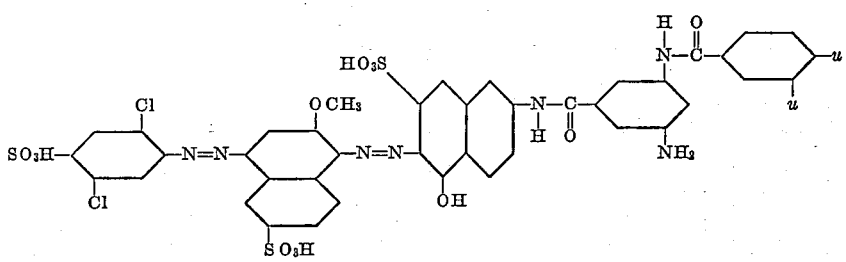

in which one $u$ stands for a hydrogen atom and the other $u$ stands for an amino group, which products are dark powders dissolving in water to blue solutions, which dyestuffs, when diazotized on the fiber and developed with 1-phenyl-3-methyl-5-pyrazolone, dye the same intensively green tints of good fastness, particularly to washing.

12. The azo-dyestuffs corresponding in the free state to the general formula

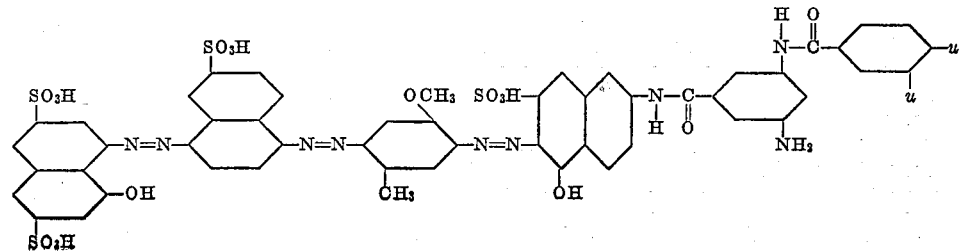

in which one $u$ stands for a hydrogen atom and the other $u$ stands for an amino group, which products are dark powders dissolving in water to blue solutions, which dyestuffs, when diazotized on the fiber and developed with 1-phenyl-3-methyl-5-pyrazolone, dye the same intensively green tints of good fastness, particularly to washing.

13. The azo-dyestuffs corresponding in the free state to the general formula

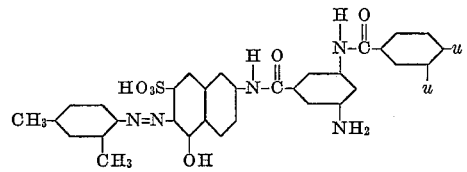

in which one $u$ stands for a hydrogen atom and the other $u$ stands for an amino group, which products are dark powders dissolving in water to red solutions and dyeing the fiber similar tints, which dyestuffs, when diazotized on the fiber and developed with $\beta$-naphthol, dye the same intensively red tints of good fastness, particularly to washing.

EMIL EDUARD MISSLIN.
RUDOLF THOMANN.